US012782125B1

(12) United States Patent
Moore

(10) Patent No.: US 12,782,125 B1
(45) Date of Patent: Nov. 3, 2026

(54) BLUETOOTH-ENABLED LEVELING DEVICE WITH WIRELESS ALIGNMENT MONITORING

(71) Applicant: Jared P Moore, Craig, CO (US)

(72) Inventor: Jared P Moore, Craig, CO (US)

( * ) Notice: Subject to any disclaimer, the term of this patent is extended or adjusted under 35 U.S.C. 154(b) by 0 days.

(21) Appl. No.: 19/355,927

(22) Filed: Oct. 10, 2025

(51) Int. Cl.
*G01C 9/04* (2006.01)
*G01C 15/00* (2006.01)
*H04W 4/38* (2018.01)
*H04W 4/40* (2018.01)

(52) U.S. Cl.
CPC ............. *G01C 9/04* (2013.01); *G01C 15/008* (2013.01); *H04W 4/38* (2018.02); *H04W 4/40* (2018.02)

(58) Field of Classification Search
CPC ......... G01C 9/04; G01C 15/008; H04W 4/38; H04W 4/40
See application file for complete search history.

(56) References Cited

U.S. PATENT DOCUMENTS 9,610,476 B1 * 4/2017 Tran ...................... A42B 3/0433
10,461,421 B1 * 10/2019 Tran .......................... H04L 9/50
10,498,029 B1 * 12/2019 Tran ........................ F21S 8/086
10,694,399 B1 * 6/2020 Tran ...................... G06N 3/0464
11,402,871 B1 * 8/2022 Berliner .................. G06F 1/163
2004/0221462 A1 * 11/2004 Liao ...................... G01C 15/008 33/286
2005/0155238 A1 * 7/2005 Levine ................. G01C 15/004 33/286
2011/0056393 A1 * 3/2011 Kachkovsky ......... B30B 9/3032 100/45
2019/0016398 A1 * 1/2019 Hartman ................. B60P 1/045
2020/0275241 A1 * 8/2020 Levy ...................... H04B 17/27
2021/0297836 A1 * 9/2021 Padgett .............. G07C 9/00309
2024/0265272 A1 * 8/2024 Cristache ................ G06F 3/017
2024/0304990 A1 * 9/2024 Tran ........................ H04W 4/40

* cited by examiner

*Primary Examiner* — Amine Benlagsir
(74) *Attorney, Agent, or Firm* — Gugliotta & Gugliotta LPA

(57) ABSTRACT

A Bluetooth-enabled leveling device features a magnetic base with V-groove attachment capability that allows secure attachment to cylindrical metallic surfaces. The device incorporates an internal orientation sensor system coupled with wireless Bluetooth communication technology that transmits real-time rotational positioning data to a companion mobile application. The magnetic attachment system provides stable mounting on ferromagnetic surfaces while the V-groove configuration specifically accommodates cylindrical components such as drive shafts and wheel assemblies. The companion mobile application serves as the primary user interface and provides several distinct operational modes including pitch finder function, bubble level display, and simultaneous pairing with up to four devices, enabling monitoring of multiple attachment points on complex machinery. Users can capture and annotate measurement data, store reference images with associated notes, and organize this documentation within the application gallery for future reference or communication with other team members.

15 Claims, 6 Drawing Sheets

BLUETOOTH-ENABLED LEVELING DEVICE WITH WIRELESS ALIGNMENT MONITORING

CROSS-REFERENCE TO RELATED APPLICATIONS

There are no previously filed, nor currently any co-pending applications, anywhere in the world.

BACKGROUND OF THE INVENTION

1. Field of the Invention

The present invention relates generally to measuring instruments and, more particularly, to a system and method for wireless measurement instruments for monitoring rotational alignment of mechanical components in heavy equipment maintenance and industrial construction applications.

2. Description of the Related Art

In industrial maintenance operations, particularly those involving heavy construction equipment and machinery, precise angular positioning of mechanical components represents a persistent operational challenge that has traditionally required multiple personnel and iterative adjustment procedures. The alignment of final drive assemblies for fluid service operations exemplifies this problem. These procedures necessitate rotating the drive unit to position fill or drain ports at specific angles relative to ground level to ensure proper fluid flow during maintenance. Conventional practice involves one technician operating the machinery controls while a second technician observes a mechanical level or other position indicator mounted on the component, communicating positioning information back to the operator through verbal instructions or hand signals.

This two-person methodology introduces several inefficiencies into maintenance workflows. The spatial separation between operator and observer creates communication delays and potential for misinterpretation of positioning instructions. The observer must maintain visual contact with the level while simultaneously signaling the operator, who cannot directly verify positioning accuracy without leaving the operator station. Achieving the target angle typically requires multiple adjustment cycles as the operator makes incremental movements based on delayed feedback. This process extends task duration, increases labor costs, and introduces opportunities for positioning errors that may necessitate additional adjustment iterations.

Similar challenges exist across numerous other industrial and construction applications. In heating, ventilation, and air conditioning installation, determining roof pitch angles informs the fabrication of specialized components such as flashing and ductwork penetrations. Traditional measurement methods require the technician to physically access the roof surface, measure the angle with a mechanical level, record the measurement, and communicate this information to fabrication personnel. Agricultural equipment maintenance, welding operations requiring precise joint angles, and structural construction verification all involve comparable requirements for accurate angular measurement in contexts where the measuring instrument may not be readily visible to the person controlling the positioning.

Existing mechanical levels and digital inclinometers provide accurate angular measurements but require direct visual observation of the display. Magnetic attachment systems allow these instruments to be mounted on ferromagnetic surfaces, yet the operator must still position themselves to view the readout. Laser levels project reference lines but do not provide numerical angle data. Some contemporary measurement tools incorporate wireless communication or smartphone connectivity, but these devices generally serve different functional purposes such as distance measurement or computational assistance rather than real-time rotational position monitoring for alignment tasks.

The fundamental limitation common to prior art solutions is the spatial coupling between measurement display and operator position. No existing tool configuration adequately addresses the specific need for remote monitoring of rotational alignment during active machinery positioning, thereby necessitating either multiple personnel or requiring the single operator to repeatedly move between control station and measurement location. This gap in available technology perpetuates inefficient maintenance procedures and represents an unmet need for a measurement solution that decouples visual feedback from physical proximity to the measuring instrument.

Some methods and devices are known that incorporate various mechanisms for wireless measurement transmission or magnetic level attachment. For example, U.S. Pat. No. 5,531,031 issued in the name of Green, discloses a device for leveling and squaring which includes a level body having a spirit vial or electronic inclinometer, wherein a battery powered laser module assembly is rotatably mounted in one end of the level body for emitting a visible laser beam therefrom. However, such a device lacks Bluetooth connectivity, mobile app integration, and the ability to track rotational data in real-time.

U.S. Pat. No. 6,568,095 issued in the name of Snyder in discloses a magnetic torpedo level adapted for removable magnetic attachment to pipes, EMT (electrical metal tubing), and other ferro metallic cylindrical objects, for measuring their level or slope. Again, this prior art lacks Bluetooth connectivity, mobile app integration, and the ability to monitor multiple devices simultaneously.

United States Patent Application Publication Number 2024/0310169 published in the name of Stanley Black & Decker discloses laser level assemblies with wireless transmitters and removable battery packs, but lacks the specific Bluetooth connectivity to a mobile application that provides real-time alignment tracking and the ability to sync and monitor multiple leveling devices simultaneously as contemplated by the present invention.

Consequently, a need has been felt for providing an apparatus and method which enables single-operator precision alignment of machinery components by wirelessly transmitting real-time rotational positioning data from a magnetically-mounted sensor to a mobile device interface, thereby eliminating the requirement for multiple personnel during precision alignment operations.

SUMMARY OF THE INVENTION

It is thus an object of the present invention to provide a method enabling single-operator precision alignment of machinery components by wirelessly transmitting real-time rotational positioning data from a magnetically-mounted sensor to a mobile device interface.

The present invention provides a Bluetooth-enabled leveling device featuring a magnetic base with V-groove attachment capability, connectivity with a mobile application that provides real-time tracking of rotation and alignment data, and the ability to sync and monitor multiple leveling devices simultaneously. In preferred embodiments, the inventive device includes a rectangular housing with a distinctive V-groove magnetic base that allows secure attachment to cylindrical metallic surfaces, an internal orientation sensor system coupled with wireless Bluetooth communication technology that transmits real-time rotational positioning data to a companion mobile application, dual laser guides positioned on opposite side walls that project alignment beams, and a charging port that allows for battery recharging without requiring battery removal. The companion mobile application serves as the primary user interface and provides several distinct operational modes including pitch finder function, bubble level display, circle round measurement, slope calculation, compass orientation, simultaneous pairing with up to four devices, capture and annotation of measurement data, and organization of documentation within the application gallery.

It is an advantage of the present invention to eliminate the requirement for multiple personnel during precision alignment operations by providing wireless transmission of positioning data to the equipment operator.

It is another advantage of the present invention to reduce the time required to achieve target alignment angles by providing continuous real-time feedback rather than requiring iterative communication between operator and observer.

It is another advantage of the present invention to improve positioning accuracy by delivering numerical angle measurements directly to the operator controlling the machinery rather than relying on verbal or visual signal interpretation.

It is another advantage of the present invention to reduce labor costs associated with heavy equipment maintenance procedures by enabling single-operator completion of tasks that traditionally required two technicians.

It is another advantage of the present invention to provide secure magnetic attachment to ferromagnetic surfaces through an integrated magnetic base that maintains stable positioning during machinery movement.

It is another advantage of the present invention to accommodate cylindrical component surfaces through a V-groove base configuration that centers the device on drive shafts, wheel assemblies, and similar rounded mechanical elements.

It is another advantage of the present invention to enable simultaneous monitoring of multiple alignment points through the capacity to pair and display data from up to four devices concurrently within a single mobile application interface.

It is another advantage of the present invention to provide documentation capabilities by allowing operators to capture measurement data, annotate reference images, and store this information for future reference or communication with other personnel.

It is another advantage of the present invention to extend applicability across multiple industries by combining magnetic attachment, rotational sensing, and wireless data transmission in a versatile measurement tool suitable for construction, agricultural equipment maintenance, welding operations, and building trades applications.

It is another advantage of the present invention to supplement wireless positioning data with visual alignment verification through integrated laser guides that project reference beams from the device housing.

It is another advantage of the present invention to provide intuitive operation through clearly marked control switches and visual indicator lights that communicate device status without requiring reference to external documentation.

Further features of the invention will become apparent in the course of the following description.

BRIEF DESCRIPTION OF DRAWINGS

The advantages and features of the present invention will become better understood with reference to the following more detailed description and claims taken in conjunction with the accompanying drawings, in which like elements are identified with like symbols, and in which:

DETAILED DESCRIPTION OF THE INVENTION

The best mode for carrying out the invention is presented in terms of its preferred embodiment, herein depicted within the Figures. It should be understood that the legal scope of the description is defined by the words of the claims set forth at the end of this patent and that the detailed description is to be construed as exemplary only and does not describe every possible embodiment since describing every possible embodiment would be impractical, if not impossible. Numerous alternative embodiments could be implemented, using either current technology or technology developed after the filing date of this patent, which would still fall within the scope of the claims.

It should also be understood that, unless a term is expressly defined in this patent there is no intent to limit the meaning of that term, either expressly or by implication, beyond its plain or ordinary meaning, and such term should not be interpreted to be limited in scope based on any statement made in any section of this patent (other than the language of the claims). To the extent that any term recited in the claims at the end of this patent is referred to in this patent in a manner consistent with a single meaning, that is done for sake of clarity only so as to not confuse the reader, and it is not intended that such claim term by limited, by implication or otherwise, to that single meaning. Finally, unless a claim element is defined by reciting the word "means" and a function without the recital of any structure, it is not intended that the scope of any claim element be interpreted based on the application of 35 U.S.C. § 112 (f).

The best mode for carrying out the invention is presented in terms of its preferred embodiment, herein depicted within the Figures.

1. Detailed Description of the Figures

According to a preferred embodiment, the invention as illustrated and described herein generally relates to a tool to indicate a position of an object relative to ground level, and more particularly, to a level indicating tool 10 capable of being placed or coupled to the object to indicate the level of the object. The indication may be visual based on the position of the level indicating tool 10 and there may be a means to provide a remote indication of the level indicating tool 10 via wireless communication between the level indicating tool 10 and a remote monitoring station. The level indicating tool 10 is capable of being utilized in a wide range of services, commercial or residential, but is particularly suited for use in verifying alignment of a final drive of construction vehicles or other heavy machinery in order to simplify the verification and minimizing the amount of personnel necessary to confirm the precise alignment of the final drive.

Figure 1:
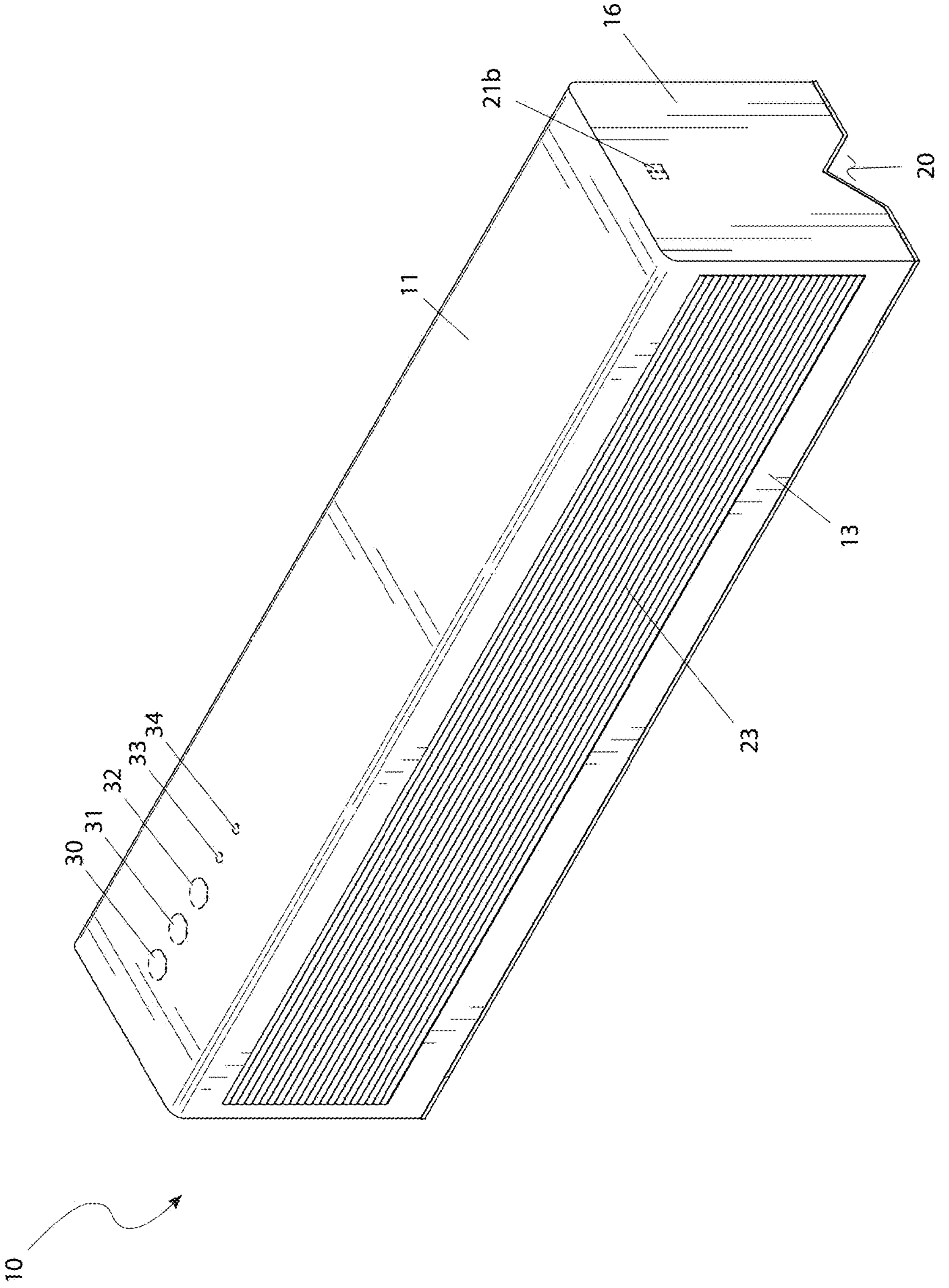
FIG. 1 is a top front perspective view of a level indicator tool 10, according to a preferred embodiment of the present invention.
Figure 2:
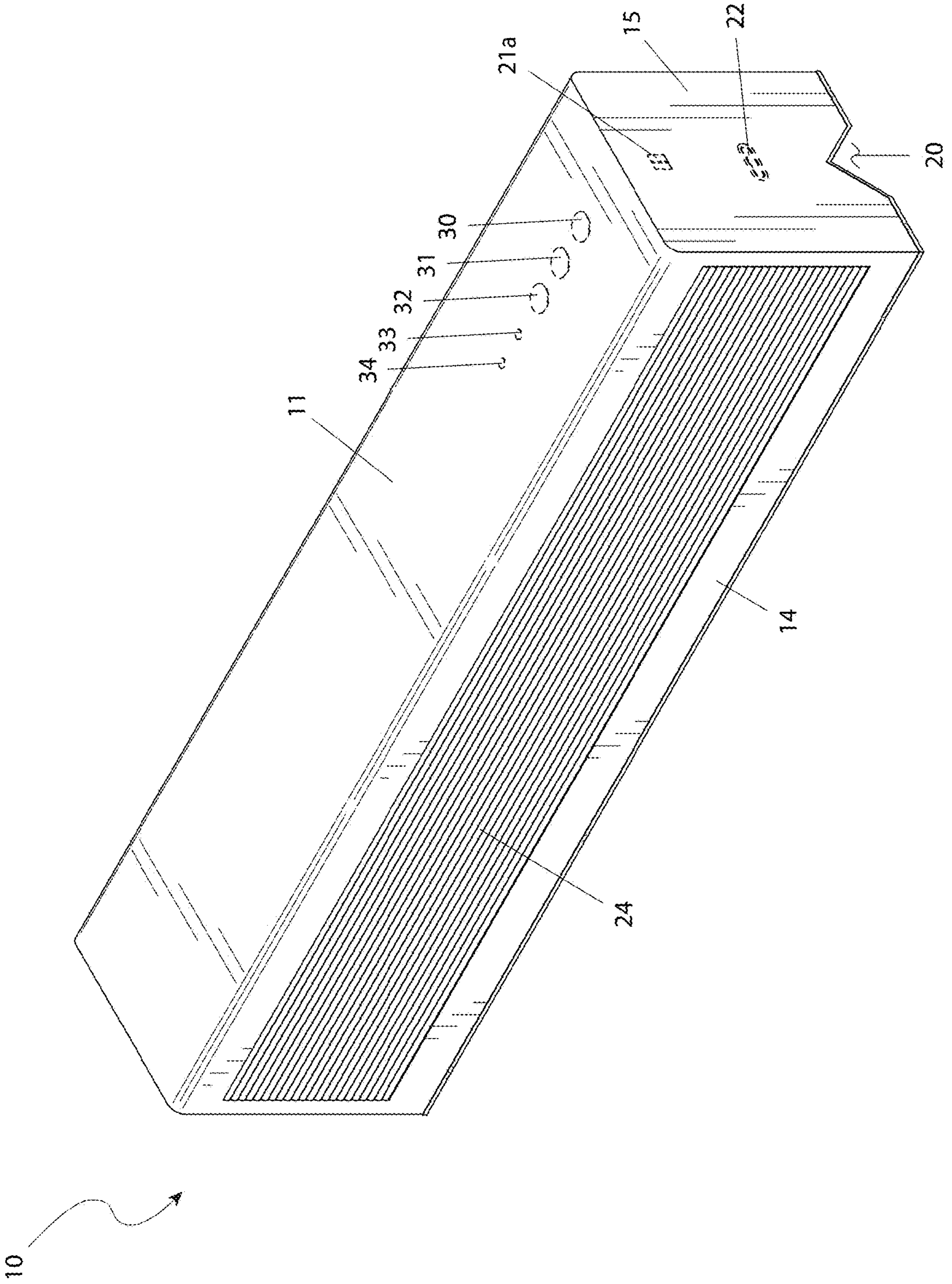
FIG. 2 is a top rear perspective view of the level indicator tool 10, according to a preferred embodiment of the present invention.
Figure 3:
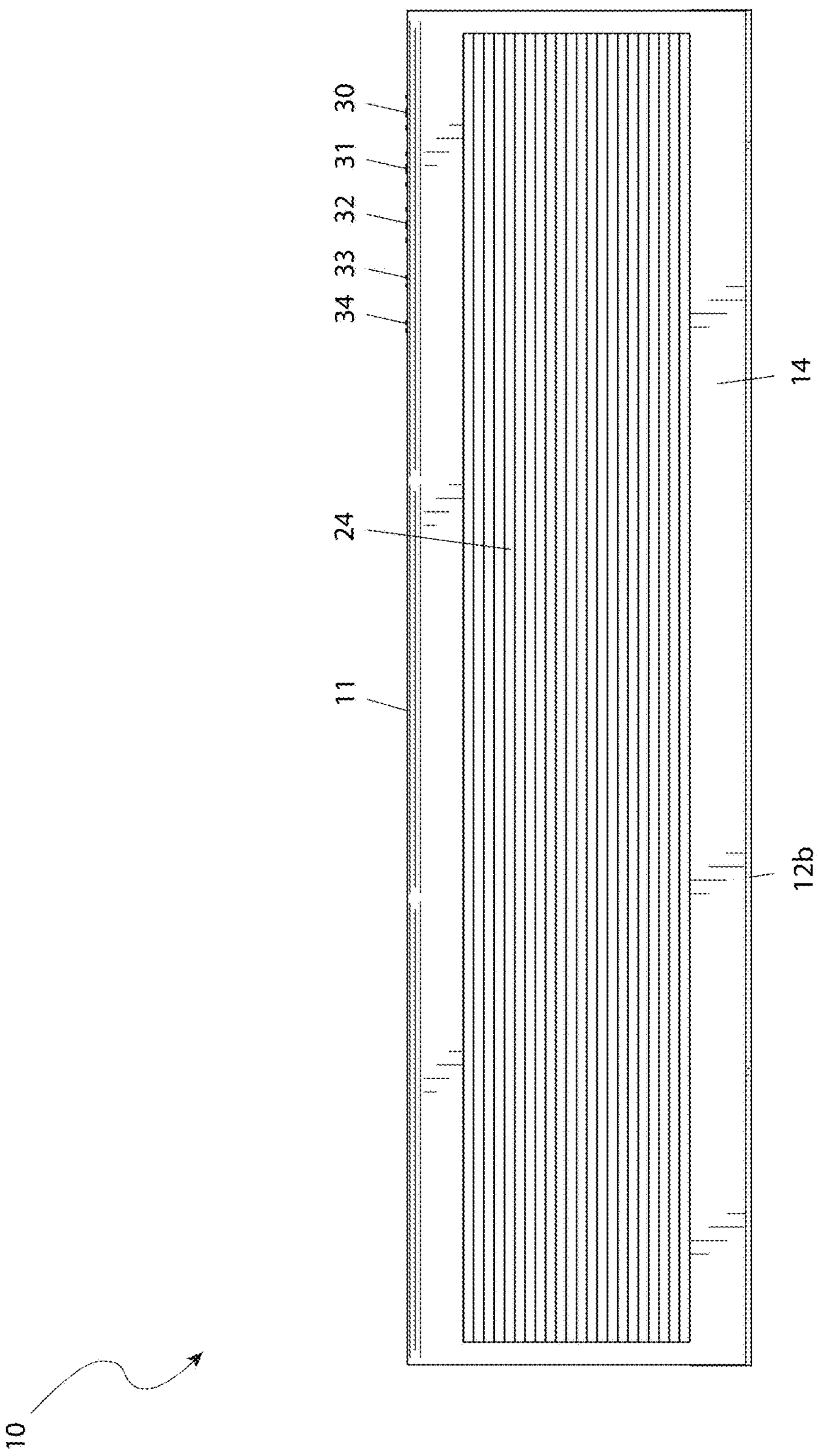
FIG. 3 is a front elevation view of the level indicator tool 10, according to a preferred embodiment of the present invention.

Referring now to FIGS. 1-3, illustrated in various views, is herein described a level indicating tool 10 in an exemplary embodiment. The overall configuration of the level indicating tool 10 is generally shaped as a rectangular prism, having a planar top wall 11, a bottom wall bisected by a longitudinal groove 20 into a bottom wall first portion **12*a* and a bottom wall second portion 12*b*, a planar front wall 13, a planar rear wall 14, a planar first side wall 15, and a planar second side wall 16. The first side wall 15 and second side wall 16 are smaller than the top wall 11, bottom wall first portion 12*a*, bottom wall second portion 12*b*, front wall 13, and rear wall 14. The transitions between each wall 11, 12*a*, 12*b*, 13, 14, 15, 16 may have smooth corners and edges to discourage or eliminate snag points so material, equipment, clothing, and users are not damaged, punctured, or marred. A front grip 23 is disposed along the outer surface of the front wall 13 and a rear grip 24 is disposed on the outer surface of the rear wall 24. The front grip 23 and rear grip 24 may be identical in shape, size, and location or they may be different. In the exemplary embodiment, the front grip 23 and rear grip 24 are disposed on the majority of the outer surface and terminate prior to the top, bottom and side edges of the front wall 13 and rear wall 14, respectively. Preferably, the front grip 23 and rear grip 24 are corrugated portions of the respective front wall 13 and rear wall 14**, or they may be features that are attached or bonded thereto.

Figure 4:
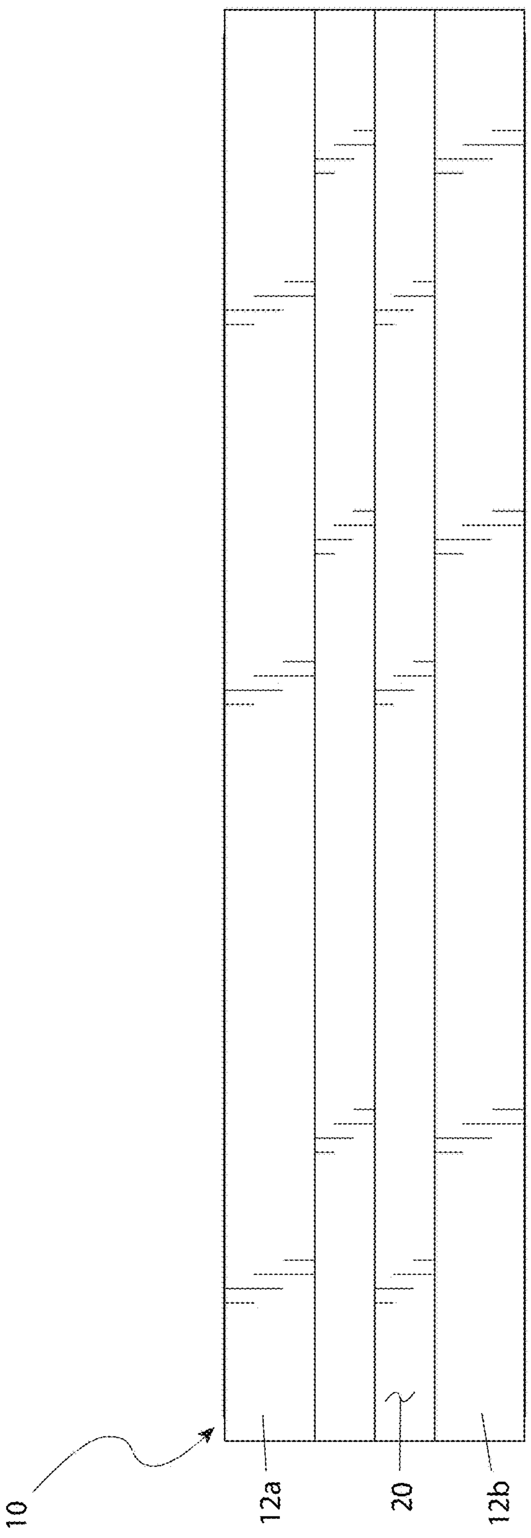
FIG. 4 is a top plan view of the level indicator tool 10, according to a preferred embodiment of the present invention.
Figure 5:
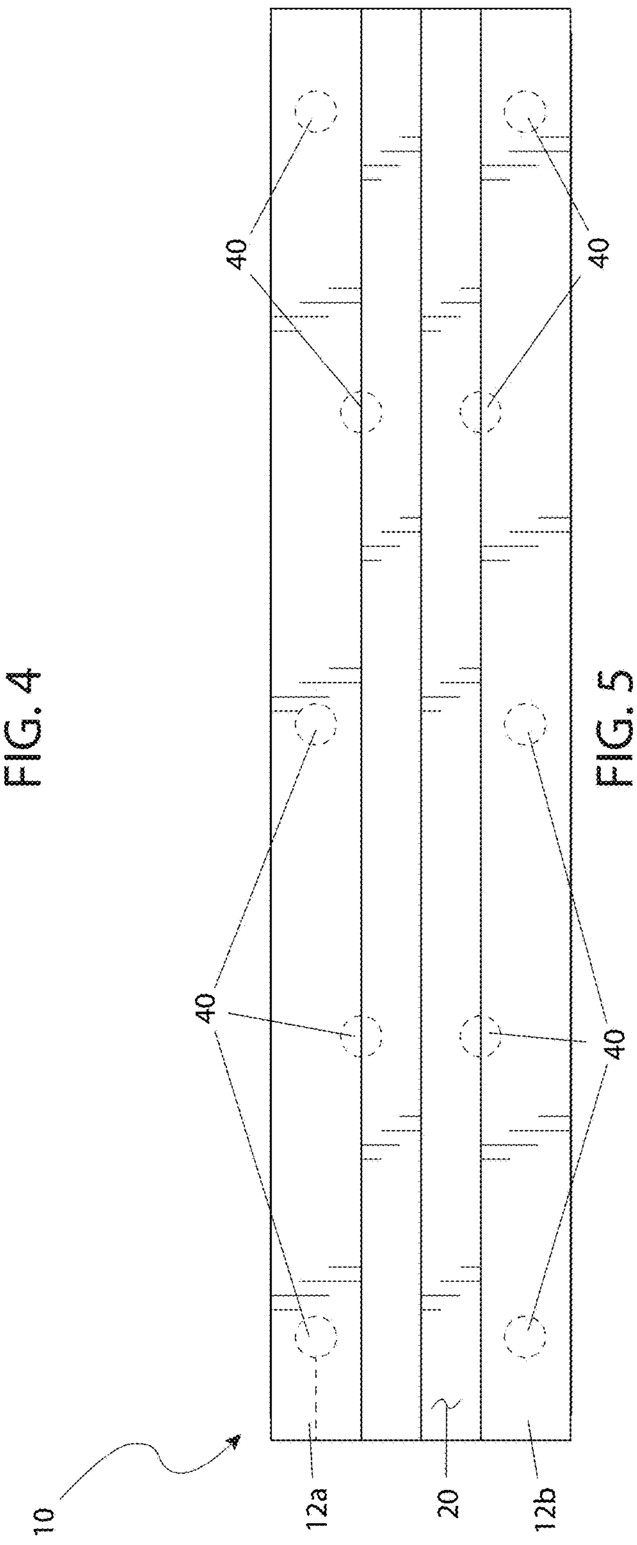
FIG. 5 is a bottom plan view of the level indicator tool 10, according to an alternate embodiment of the present invention.

FIGS. 4 and 5 illustrate bottom plan views of the level indicating tool 10 to indicate that the bottom wall is split into the bottom wall first portion **12*a* and a bottom wall second portion 12*b* by the groove 20. The groove 20 bisects the bottom wall and is coextensive with the overall length thereof. The groove 20 is an inverse "V"-shape and extends inwards towards the center of the level indicating tool 10 at a depth, which in certain embodiments may be one-quarter to one-half inch (¼-½ in.). The bottom wall first portion 12*a* and bottom wall second portion 12*b*** are planar.

Referring now more closely to FIG. 5, in an alternate embodiment, it can be seen that at least one (1) magnetic feature 40 is embedded within the level indicating tool 10, preferably disposed immediately adjacent to the bottom wall thereof. Each magnetic feature 40 is capable of providing a magnetic attachment means for the level indicating tool 10 to the object upon which a level position is desired to be known. The magnetic features 40 may be any size or shape or strength of magnetic attraction and can be oriented either on the bottom wall first portion **12*a*, bottom wall second portion 12*b*, groove 20, or any combination thereof. Portions of the magnetic features 40** may be exposed or totally embedded.

Referring now back to FIG. 2, located on the first side wall 15 is a first laser guide **21*a* and a charging port 22. The charging port 22 may be in electrical communication with an on-board power source to provide a charging function thereto. The first laser guide 21*a* incorporates a laser diode, also in electrical communication with the on-board power source, for producing a first laser beam directed outwardly therefrom. In the exemplary embodiment, the first laser guide 21*a* and charging port 22 are aligned along a common bisecting first side centerline such that the charging port 22 is positioned near a center of the first side wall 15 and the first laser guide 21*a* is positioned adjacent a top edge thereof (i.e., adjacent the first edge of the top wall 11). Referring back to FIG. 1, it can be seen that a second laser guide 21*b* is located on the second side wall 16 of the level indicating tool 10. The second laser guide 21*b* also incorporates a laser diode in electrical communication with the on-board power source for producing a second laser beam directed outwardly therefrom. In the exemplary embodiment, the second laser guide 21*b* is positioned such that it is aligned with the first laser guide 21*a* and adjacent a top edge thereof (i.e., adjacent the second edge of the top wall 11**).

There are electronic features, each in electrical communication with an on-board power source, that are integral with the level indicating tool 10. Located on the top wall 11, a power switch 30, a laser guide switch 31, and a wireless connection switch 32 each can provide a user interface to selectively activate a separate individual electronic function. In the exemplary embodiment, the power switch 30, the laser guide switch 31, and the wireless connection switch 32 are arranged along a common bisecting top centerline of the top wall 11 and located between the center point and a first edge (i.e., adjacent the first side wall 15) thereof. The electronic function of the power switch 30 selectively activates the electronic functions level indicating tool 10. The electronic function of the laser guide switch 31 selectively activates either or both laser guides **21*a*, 21*b*. The electronic function of the wireless connection switch 32 selectively activates a wireless communication between the level indicating tool 10 and the remote monitoring station. A first indicator 33 and a second indicator 34 may also be aligned with the power switch 30, the laser guide switch 31, and the wireless connection switch 32 along the aforementioned common bisecting top centerline. The first indicator 33 may be in electronic communication with the power switch 30 such that when activated, the first indicator 33 may constantly illuminate. Similarly, the second indicator 34 may be in electronic communication with the wireless connection switch 32 such that when activated, the second indicator 34 may constantly illuminate. Other features associated with the level indicating tool 10 can include a camera in electrical communication with the on-board power source. Any camera can be located on any surface of the level indicating tool 10**.

Figure 6:
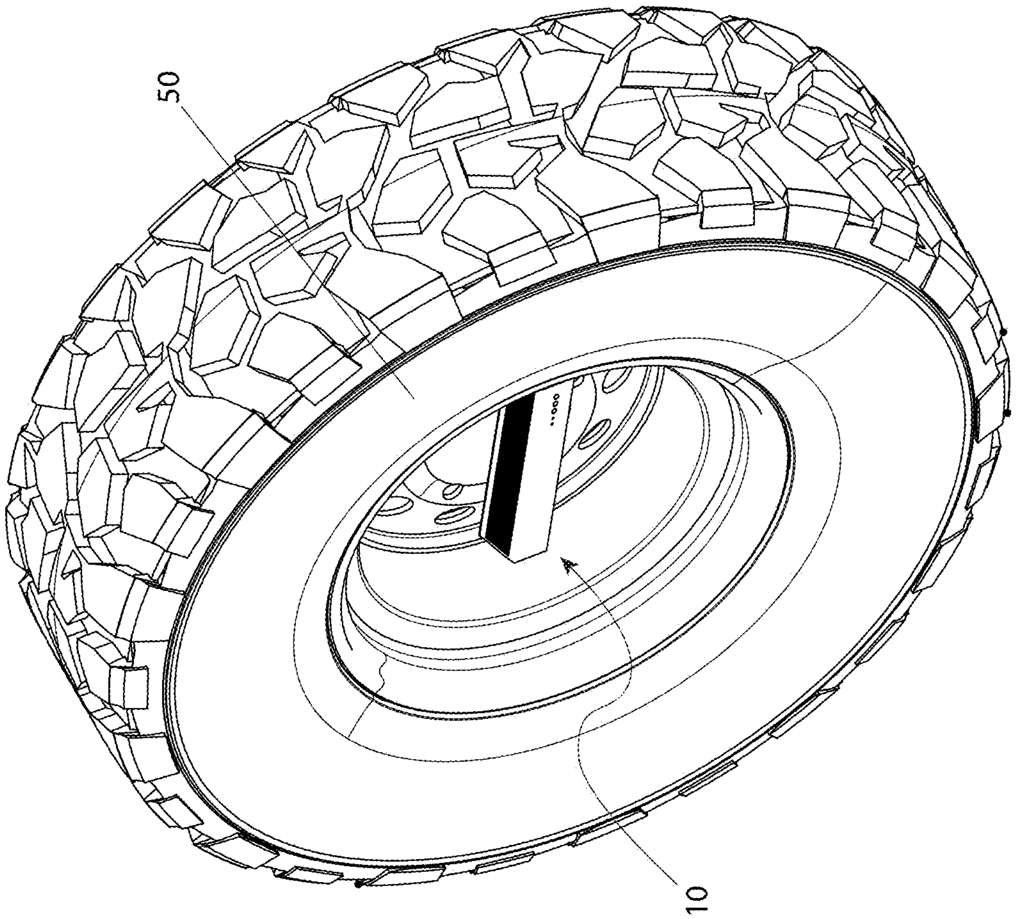
FIG. 6 is an environmental view of the level indicator tool 10 magnetically attached to a vehicle wheel 50, according to a preferred embodiment of the present invention.

Referring now to FIG. 6, in an exemplary method of use of the alternate embodiment of the level indicating tool 10, is herein described. If the object to be monitored for level position possesses portions with ferromagnetic properties, the bottom wall is placed against the object such that the magnetic features 40 are magnetically attracted thereto and enable the level indicating tool 10 to be removably attached thereto. Such an object may be a rim of a vehicle wheel 50. In a method of use, once the power switch 30 and the laser guide switch 31 are activated, the laser guides 21*a*, 21*b* project the first and second laser beams outwardly, respectively, when activated by the laser guide switch 31, to aid in identifying a level position. The wireless connection switch 20, when activated, can provide a real-time monitoring of the precise positioning of the level indicating tool 10, and thus, the object to be monitored for level position.

Figure 7B:
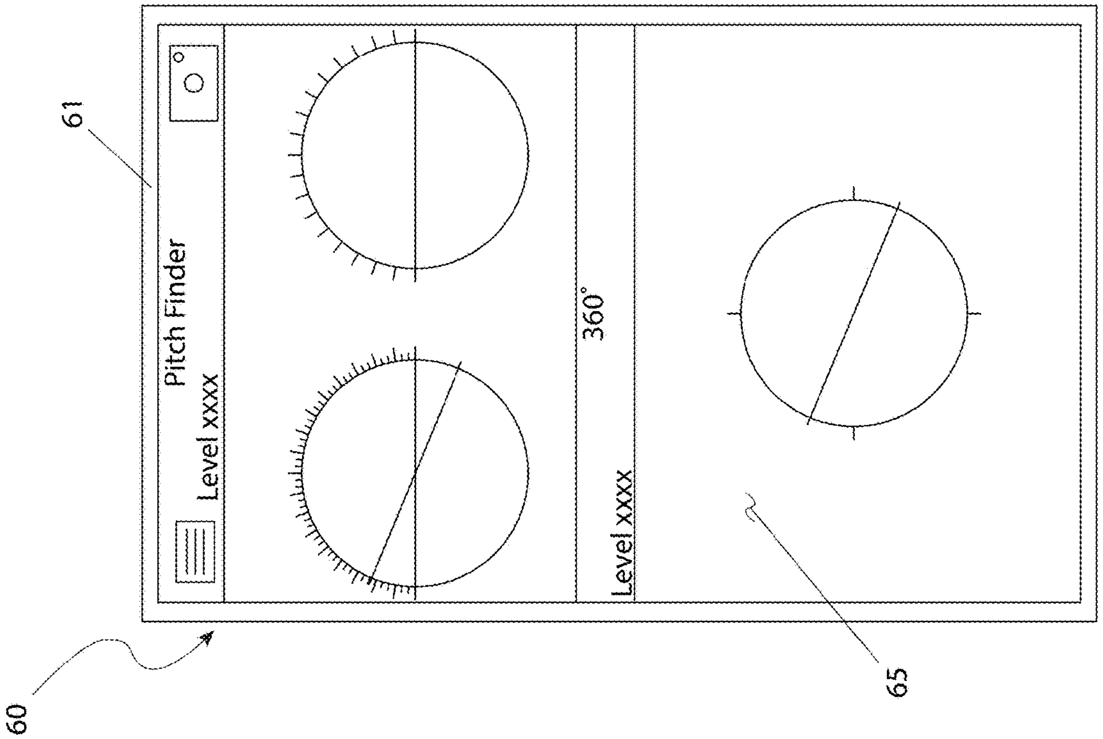
FIG. 7*a* illustrates an exemplary view of a menu page 62 of an application 60 as seen in a personal electronic device 61, according to a preferred embodiment of the present invention; and, FIG. 7*b* illustrates an exemplary view of a chosen parameter page 65 of the application 60 as seen in the personal electronic device 61, according to a preferred embodiment of the present invention.
Figure 7A:
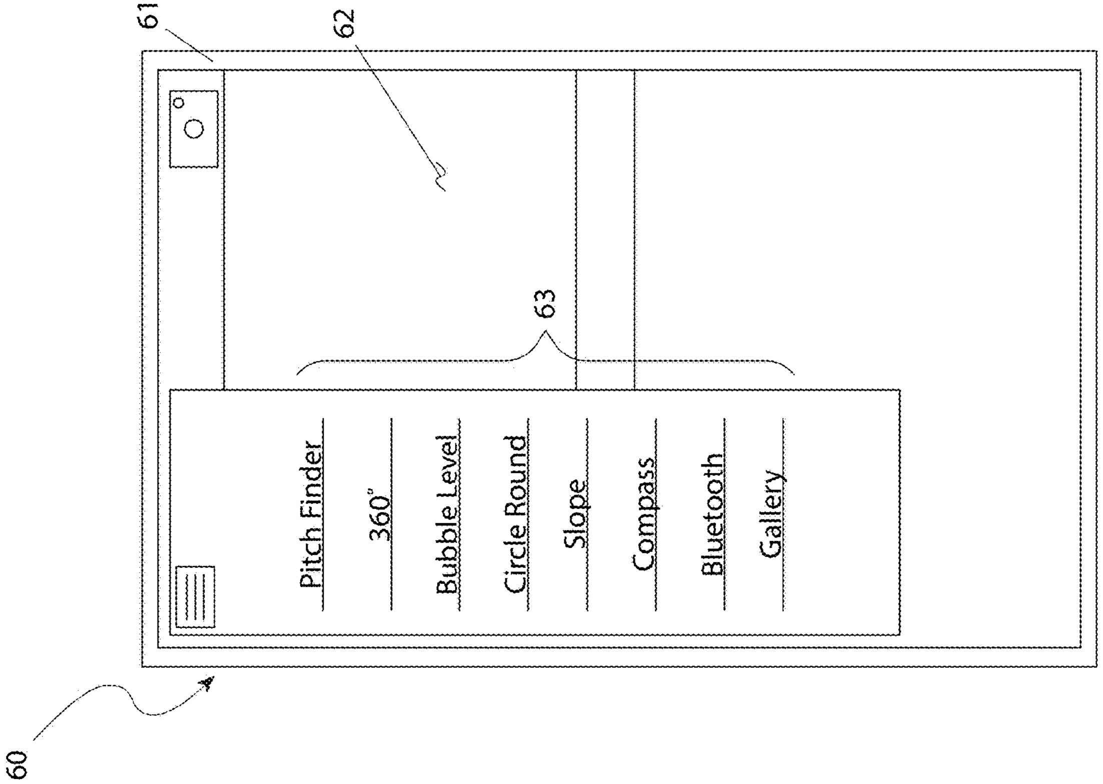

Referring now to FIGS. 7*a*-7*b*, an illustration of a menu page 62 associated with the application 60 as viewed on the personal electronic device 61 in an exemplary embodiment of the level indicator tool 10, is described herein. As forementioned, activation of the wireless connection switch 32 commences a wireless communication event between the level indicating tool 10 and a remote monitoring station. In some embodiments, the remote monitoring station can comprise the application 60 capable of being viewed or accessed by an authorized user, such as on a personal electronic device 61. The level indicating tool 10 can be presented with a subscription or access to the application 61. The application 61 can monitor up to four (4) level indicating tools 10. FIG. 7*a* illustrates an exemplary menu page 62 which can include multiple selectable features that can monitor parameters associated with an individual level indicating tool 10. The features are then displayed on a chosen parameter page 65. Examples of features can include pairing or removing of an individual level indicating tool 10 with the application 60, a level position, activation of any camera, storing, viewing, and manipulating of any images captures by any camera, recording and storing of notes associated with the level indicating tool 10 or any image captured by any camera, are able to select the back option to leave the image.

2. Operation of the Preferred Embodiment

Referring now to FIG. 6, in an exemplary method of use of the alternate embodiment of the level indicating tool 10, is herein described. If the object to be monitored for level position possesses portions with ferromagnetic properties, the bottom wall is placed against the object such that the magnetic features 40 are magnetically attracted thereto and enable the level indicating tool 10 to be removably attached thereto. Such an object may be the rim of a vehicle wheel 50.

In a method of use, once the power switch 30 and the laser guide switch 31 are activated, the laser guides 21*a*, 21*b* project the first and second laser beams outwardly, respectively, when activated by the laser guide switch 31, to aid in identifying a level position. The wireless connection switch 32, when activated, can provide a real-time monitoring of the precise positioning of the level indicating tool 10, and thus, the object to be monitored for level position.

Referring now to FIGS. 7*a* through 7*b*, an illustration of a menu page 62 associated with the application 60 as viewed on the personal electronic device 61 in an exemplary embodiment of the level indicator tool 10, is described herein. As forementioned, activation of the wireless connection switch 32 commences a wireless communication event between the level indicating tool 10 and a remote monitoring station. In some embodiments, the remote monitoring station can comprise the application 60 capable of being viewed or accessed by an authorized user, such as on a personal electronic device 61.

The level indicating tool 10 can be presented with a subscription or access to the application 60. The application 60 can monitor up to four level indicating tools 10. FIG. 7*a* illustrates an exemplary menu page 62 which can include multiple selectable features that can monitor parameters associated with an individual level indicating tool 10. The features are then displayed on a chosen parameter page 65. Examples of features can include pairing or removing of an individual level indicating tool 10 with the application 60, a level position display showing pitch finder measurements with 360 degree rotation tracking, bubble level indication, circle round measurements, slope calculations, compass orientation, activation of any camera, storing, viewing, and manipulating of any images captured by any camera, and recording and storing of notes associated with the level indicating tool 10 or any image captured by any camera.

To pair a level device with the application 60, the user presses and holds the Bluetooth button on the level device until the indicator light begins to flash. The user then opens the app on their phone and selects the menu tab in the top left corner, selects the Bluetooth option, and selects add device. All available devices will appear listed with their serial numbers. The user selects the device to be paired and selects Pair. Once the device is paired the indicator light will stop flashing and remain solid.

To remove a level device, the user selects the Bluetooth option, selects Remove Device, selects the device they wish to remove, and chooses the Remove option. The selected device will no longer be paired.

To capture an image of current measurements, the user selects the camera icon in the top right corner of the app and selects Save to save the image to the gallery. Once the image is saved in the gallery the user is able to place notes on any image needed.

To view or delete an image, the user chooses the gallery option within the menu tab and all images will appear. To view, the user selects the image by tapping on the image of choice. To remove the image the user presses and holds the image of choice, selects images to be deleted, and selects the Delete option. All notes associated with images being deleted will also be removed.

To view or add notes to a captured image, the user selects the gallery option within the menu tab, selects the chosen image, and selects the notes option. The user creates the desired note and selects Save to save the note with the image. The notepad will leave once the note has been saved. If no changes are made the user is able to select the back option to leave the image.

To select a job option to perform, the user selects the option of choice from the menu tab. The level device will display to the right of the job option chosen. If only one level device is powered on and paired to the app, the user will only see one device. If there are multiple level devices powered on and paired, they will all appear next to the job option. The user selects the level device or devices they wish to use with the chosen job option.

The foregoing descriptions of specific embodiments of the present invention are presented for purposes of illustration and description. The Title, Background, Summary, Brief Description of the Drawings and Abstract of the disclosure are hereby incorporated into the disclosure and are provided as illustrative examples of the disclosure, not as restrictive descriptions. It is submitted with the understanding that they will not be used to limit the scope or meaning of the claims. In addition, in the Detailed Description, it can be seen that the description provides illustrative examples, and the various features are grouped together in various embodiments for the purpose of streamlining the disclosure. This method of disclosure is not to be interpreted as reflecting an intention that the claimed subject matter requires more features than are expressly recited in each claim. Rather, as the following claims reflect, inventive subject matter lies in less than all features of a single disclosed configuration or operation. The following claims are hereby incorporated into the Detailed Description, with each claim standing on its own as a separately claimed subject matter.

The claims are not intended to be limited to the aspects described herein but is to be accorded the full scope consistent with the language claims and to encompass all legal equivalents. Notwithstanding, none of the claims are intended to embrace subject matter that fails to satisfy the requirement of 35 U.S.C. § 101, 102, or 103, nor should they be interpreted in such a way. Any unintended embracement of such subject matter is hereby disclaimed. They are not intended to be exhaustive nor to limit the invention to precise forms disclosed and, obviously, many modifications and variations are possible in light of the above teaching. The embodiments are chosen and described in order to best explain principles of the invention and its practical application, to thereby enable others skilled in the art to best utilize the invention and its various embodiments with various modifications as are suited to the particular use contemplated. It is intended that a scope of the invention be defined broadly by the Drawings and Specification appended hereto and to their equivalents. Therefore, the scope of the invention is in no way to be limited only by any adverse inference under the rulings of Warner-Jenkinson Company, v. Hilton Davis Chemical, 520 US 17 (1997) or Festo Corp. v. Shoketsu Kinzoku Kogyo Kabushiki Co., 535 U.S. 722 (2002), or other similar caselaw or subsequent precedent should not be made if any future claims are added or amended subsequent to this Patent Application.

The invention claimed is:

1. A leveling device comprising:

a housing having a top wall, a bottom wall, a front wall, a rear wall, a first side wall, and a second side wall;

wherein said bottom wall includes a longitudinal groove extending along a length thereof and dividing said bottom wall into a first portion and a second portion, said groove configured in an inverse V-shape;

at least one magnetic element disposed adjacent to said bottom wall configured to magnetically attach said housing to a ferromagnetic surface;

an orientation sensor disposed within said housing configured to detect rotational positioning of said housing;

a wireless communication module disposed within said housing and in electronic communication with said orientation sensor, said wireless communication module configured to wirelessly transmit rotational positioning data to a remote electronic device;

a power source disposed within said housing and in electrical communication with said orientation sensor and said wireless communication module;

a power switch disposed on said top wall and in electrical communication with said power source, said power switch configured to selectively activate and deactivate electrical power to components of said leveling device;

a wireless connection switch disposed on said top wall and in electrical communication with said wireless communication module, said wireless connection switch configured to selectively activate and deactivate wireless transmission of said rotational positioning data; and a charging port disposed on said first side wall and in electrical communication with said power source, said charging port configured to receive the electrical power for recharging said power source; and a mobile application configured to execute on said remote electronic device, said mobile application configured to:

receive said rotational positioning data from said wireless communication module via a Bluetooth wireless communication module;

process said rotational positioning data to determine an angular orientation of said leveling device; and display said angular orientation on a display screen of said remote electronic device.

2. The leveling device of claim 1, wherein said groove extends inward toward a center of said housing at a depth of between one-quarter inch and one-half inch.

3. The leveling device of claim 1, wherein said wireless communication module comprises the Bluetooth wireless communication module configured to transmit said rotational positioning data via Bluetooth wireless protocol.

4. The leveling device of claim 1, further comprising:

a first laser guide disposed on said first side wall and in electrical communication with said power source, said first laser guide configured to project a first laser beam outward from said first side wall;

a second laser guide disposed on said second side wall and in electrical communication with said power source, said second laser guide configured to project a second laser beam outward from said second side wall; and a laser guide switch disposed on said top wall and in electrical communication with said first laser guide and said second laser guide, said laser guide switch configured to selectively activate and deactivate projection of said first laser beam and said second laser beam.

5. The leveling device of claim 4, wherein said first laser guide and said second laser guide are positioned adjacent respective top edges of said first side wall and said second side wall.

6. The leveling device of claim 1, further comprising:

a first indicator disposed on said top wall and in electrical communication with said power switch, said first indicator configured to provide visual indication of power status; and a second indicator disposed on said top wall and in electrical communication with said wireless connection switch, said second indicator configured to provide visual indication of wireless connection status.

7. The leveling device of claim 1, further comprising:

a front grip disposed on an outer surface of said front wall; and a rear grip disposed on an outer surface of said rear wall;

wherein said front grip and said rear grip comprise textured surfaces configured to facilitate manual gripping of said housing.

8. The leveling device of claim 7, wherein said front grip and said rear grip comprise corrugated surfaces.

9. The leveling device of claim 1, wherein said at least one magnetic element comprises a plurality of magnetic elements distributed along said bottom wall.

10. The leveling device of claim 1, wherein said orientation sensor comprises at least one of an accelerometer, a gyroscope, and a magnetometer configured to detect the angular orientation of said housing relative to a gravitational reference.

11. A system for monitoring rotational alignment comprising:

a leveling device, wherein the leveling device comprising;

a housing having a top wall, a bottom wall, a front wall, a rear wall, a first side wall, and a second side wall;

wherein said bottom wall includes a longitudinal groove extending along a length thereof and dividing said bottom wall into a first portion and a second portion, said groove configured in an inverse V-shape;

at least one magnetic element disposed adjacent to said bottom wall configured to magnetically attach said housing to a ferromagnetic surface;

an orientation sensor disposed within said housing configured to detect rotational positioning of said housing;

a wireless communication module disposed within said housing and in electronic communication with said orientation sensor, said wireless communication module configured to wirelessly transmit rotational positioning data to a remote electronic device; a power source disposed within said housing and in electrical communication with said orientation sensor and said wireless communication module;

a power switch disposed on said top wall and in electrical communication with said power source, said power switch configured to selectively activate and deactivate electrical power to components of said leveling device;

a wireless connection switch disposed on said top wall and in electrical communication with said wireless communication module, said wireless connection switch configured to selectively activate and deactivate wireless transmission of said rotational positioning data; and a charging port disposed on said first side wall and in electrical communication with said power source, said charging port configured to receive the electrical power for recharging said power source, wherein said wireless communication module comprises a Bluetooth wireless communication module configured to transmit said rotational positioning data via Bluetooth wireless protocol; and a mobile application configured to execute on said remote electronic device, said mobile application configured to:

receive said rotational positioning data from said wireless communication module via the Bluetooth wireless communication module;

process said rotational positioning data to determine an angular orientation of said leveling device; and display said angular orientation on a display screen of said remote electronic device.

12. The system of claim 11, wherein said mobile application is further configured to simultaneously receive and display said rotational positioning data from a plurality of leveling devices, each of said plurality of leveling devices wirelessly paired with said mobile application.

13. The system of claim 12, wherein said mobile application is configured to simultaneously monitor up to four leveling devices of said plurality of leveling devices.

14. The system of claim 11, wherein said mobile application is further configured to:

capture measurement data representing said angular orientation at a specified time;

associate annotation data with said captured measurement data; and store said captured measurement data and said associated annotation data in electronic memory.

15. The system of claim 14, wherein said mobile application is further configured to capture image data from a camera of said remote electronic device and associate said image data with said captured measurement data.

* * * * *